United States Patent [19]
Engelbach

[11] Patent Number: 5,022,432
[45] Date of Patent: Jun. 11, 1991

[54] BUBBLER VALVE
[75] Inventor: Brian W. Engelbach, Columbus, Ohio
[73] Assignee: Therm-O-Disc, Incorporated, Mansfield, Ohio
[21] Appl. No.: 318,253
[22] Filed: Mar. 3, 1989
[51] Int. Cl.⁵ .............................................. G05D 16/08
[52] U.S. Cl. .................................. 137/495; 137/505.41
[58] Field of Search .................... 137/495, 503, 505.41, 137/505.42, 505.13; 251/323; 137/510

[56] References Cited

U.S. PATENT DOCUMENTS

| | | | |
|---|---|---|---|
| 2,301,031 | 11/1942 | Ferguson | 137/505.13 X |
| 3,089,510 | 5/1963 | Lum | 137/495 X |
| 3,111,962 | 11/1963 | Cox et al. | 137/505.42 X |
| 3,493,010 | 2/1970 | Dreibelbis | 137/495 X |
| 3,730,773 | 5/1973 | Graber | 137/505.41 X |
| 4,275,764 | 6/1981 | Baret | 137/505.41 X |
| 4,744,387 | 5/1988 | Otteman | 137/505.42 |

FOREIGN PATENT DOCUMENTS

| | | | |
|---|---|---|---|
| 488184 | 12/1929 | Fed. Rep. of Germany | 137/495 |
| 732400 | 6/1955 | United Kingdom | 137/495 |

Primary Examiner—Stephen M. Hepperle
Attorney, Agent, or Firm—Jones, Day, Reavis & Pogue

[57] ABSTRACT

A bubbler valve has a metering flow control poppet that is pressure imbalanced in the closed direction. The poppet is selectively yieldably biased open by a spring, and inlet pressure acting on the poppet in opposition to the spring adjusts the open position of the poppet.

7 Claims, 1 Drawing Sheet

BUBBLER VALVE

BACKGROUND OF THE INVENTION

This application relates to the art of valves and, more particularly, to valves of the type that are pressure imbalanced in the closed direction. The invention is particularly applicable for use in bubbler valves for drinking fountains and will be described with specific reference thereto. However, it will be appreciated that the invention has broader aspects and can be used for controlling flow of liquids in other environments.

Excessive water line pressure can cause a water stream from a bubbler valve on a drinking fountain to overshoot the drain pan and cause damage. It would be desirable to have a bubbler valve that would maintain a substantially uniform flow of water over a wide range of inlet pressures.

SUMMARY OF THE INVENTION

A valve has a poppet biased toward a closed position by inlet pressure. A yieldable biasing spring selectively biases the poppet to an open position against the force of inlet pressure. The balance between the yieldable spring and inlet pressure adjusts the open position of the poppet to regulate flow.

In a preferred arrangement, the valve of the present application includes a pressure chamber between inlet and outlet ports. Pressure responsive means within the pressure chamber is responsive to pressure therein for adjusting the open position of the poppet.

The pressure responsive means in the pressure chamber may comprise a piston and flexible diaphragm connected with the poppet.

The poppet extends through the valve inlet port and has an enlarged frusto-conical end portion facing toward a seat on the inlet pressure side of the inlet port.

It is a principal object of the present invention to provide an improved valve that is pressure imbalanced in a closed direction.

It is another object of the invention to provide a valve that will remain closed when subjected to excessive inlet pressure, and that will perform this function without being limited, by the force of a closing spring.

It is also an object of the invention to provide a valve that is capable of maintaining substantially uniform flow over a wide range of inlet pressures.

It is a further object of the invention to provide an improved piston and diaphragm arrangement for such a valve.

It is an additional object of the invention to provide such a valve having an improved poppet seat at an inlet port.

DESCRIPTION OF PREFERRED EMBODIMENTS

Figure 1:
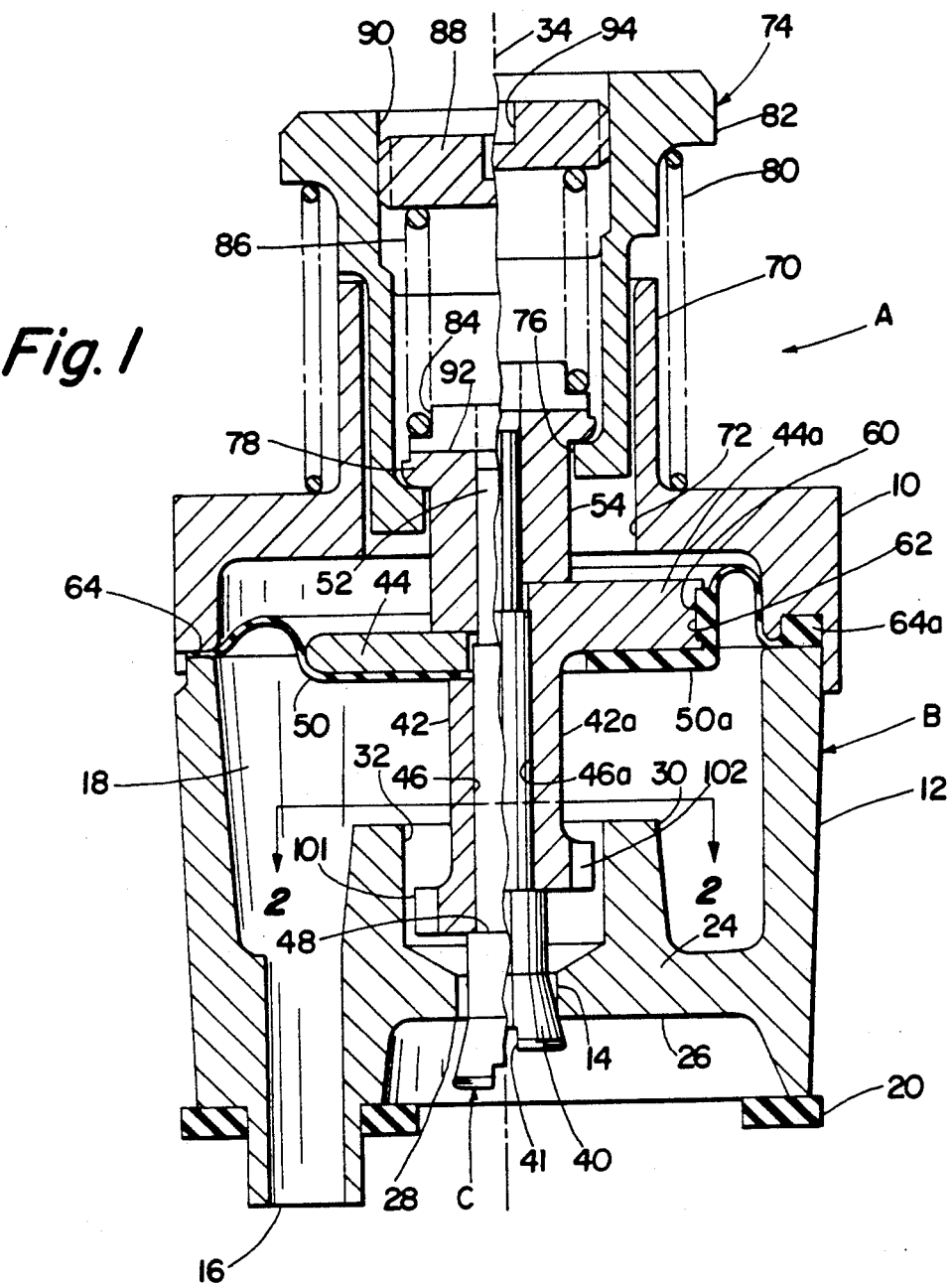
FIG. 1 is a cross-sectional elevational view of a valve constructed in accordance with the present application.
Figure 2:
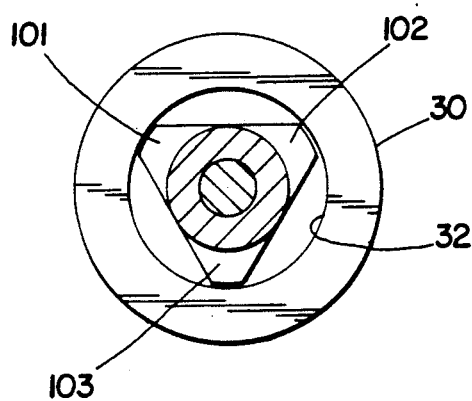
FIG. 2 is a partial cross-sectional elevational view taken generally on line 2—2 of FIG. 1.

Referring now to the drawing, wherein the showings are for purposes of illustrating certain preferred embodiments of the invention only and not for purposes of limiting same, FIG. 1 shows a valve A having a plastic housing B defined by assembled upper and lower plastic housing parts 10, 12.

Inlet and outlet ports 14, 16 are provided in housing B, and an internal pressure chamber 18 is provided between such ports.

A gasket 20 is provided for mounting valve A in a known manner with inlet port 14 connected to a pressurized water source, while outlet port 16 is connected to the outlet of a bubbler on a drinking fountain.

Inlet port 14 comprises a generally cylindrical hole through a wall 24 of housing B, and having an inlet pressure side 26 intersected by inlet port 14 at a relatively sharp circular edge 28. An annular guide sleeve 30 extends upwardly from housing wall 24 in outwardly-spaced relationship to inlet port 14 and has an inner cylindrical bore 32 therein.

The movable components of valve A are shown in a valve closed position on the right side of center line 34 and in a valve open position on the left side of center line 34. In addition, two different embodiments of a piston and diaphragm assembly are shown on the opposite sides of center line 34.

Movable poppet means C in the form of an elongated poppet member extends upwardly through inlet port 14. An enlarged head 40 on the bottom end portion of poppet C has an external frusto-conical surface facing toward seat 28. A screw driver slot 41 is provided in the bottom end of poppet C to facilitate assembly.

On the left side of center line 34 there is shown a sleeve member 42 that is separate from piston 44. On the right side of center line 34, sleeve member 42a is integral with piston 44a. Poppet C extends through a central hole 46, 46a in sleeve member 42, 42a, and has a shoulder 48 engaging the bottom end of sleeve member 42, 42a. Poppet C extends upwardly through central holes in diaphragm 50, 50a and in piston 44, 44a. A threaded upper end portion 52 on poppet C is threaded into a tapped hole in a retainer 54.

On the left of center line 34, an inner peripheral portion of diaphragm 50 is trapped between the upper end of sleeve member 42 and piston 44. The inner peripheral portion of diaphragm 50 is firmly clamped between the upper end of sleeve member 42 and piston 44 by all of these parts being compressed between poppet shoulder 48 and retainer member 54.

On the right side of center line 34, sleeve member 42a and integral piston 44a are simply gripped between poppet shoulder 48 and retainer member 54 to connect same to poppet C. Piston 44a has a circumferential groove 60 in the outer periphery thereof closely receiving an inwardly extending circumferential projection 62 on diaphragm 50a. The central portion of diaphragm 50a is of generally cup-like configuration and the diameter of the inner surface of diaphragm projection 62 is somewhat smaller than the diameter of the bottom of recess 60. Therefore, the central cup-like portion of diaphragm 50a is stretched and grippingly engages piston 44a to retain the diaphragm and piston assembled. Obviously, adhesive could be provided in recess 60 for bonding diaphragm projection 62 therein if so desired. A diaphragm outer peripheral portion 64, 64a is compressively gripped between housing parts 10, 12 which are welded or otherwise suitably secured together.

A button actuator guide sleeve 70 extends upwardly from housing part 10 and has a central cylindrical hole 72 therethrough. An actuator button 74 is received in hole 72 and has an inwardly extending flange 76 engageable with an outwardly extending flange 78 on retainer member 54. First biasing means defined by a coil spring 80 acts on actuator button 74 to normally bias poppet C closed as shown on the right side of center line 34 with the frusto-conical end portion 40 of poppet C engaging seat 28. Coil spring 80 surrounds guide sleeve 70 and acts between an upper surface of housing part 10 and an outwardly extending flange 82 on actuator button 74.

The upper end portion of retainer member 54 has an outer circumferential recess 84 therein receiving one end portion of a coil spring 86 defining second biasing means. The opposite end portion of spring 86 acts against the bottom surface of an adjustable stop member 88 threaded into a tapped hole 90 in actuator button 74. The upper end portion of retainer member 54 has a screw driver slot therein, the bottom of which is shown at 92 in FIG. 1. Adjustable stop member 94 also has a screw driver slot 94 therein.

Sleeve member 42, 42a has outwardly extending guide projections 101, 102 and 103 thereon closely received within cylindrical bore 32 in guide sleeve 30. This guides movement of poppet C between its open and closed positions, and maintains the center line of poppet C coincidental with the center of inlet port 14.

The parts are normally positioned as shown to the right of center line 34, with first yieldable biasing means 80 biasing actuator button 74 upwardly to pull poppet C to its closed position. Manual pushing force applied to button 74 will move same downwardly to the position shown on the left side of center line 34 and this relieves the force of first yieldable biasing means 80 acting on poppet C. This allows second yieldable biasing means 86 to bias poppet C to its open position shown on the left of center line 34. Inlet pressure acting on the bottom end of poppet C tends to move poppet C to its closed position against the biasing force of second yieldable biasing means 86. The balance between the biasing force of second yieldable biasing means 86 and the inlet pressure will adjust the open position of poppet C to maintain a regulated flow through outlet port 16. In the event excessive pressure builds up within pressure chamber 18, such pressure acts on piston 44, 44a and diaphragm 50, 50a to move poppet C toward its closed position to further adjust the flow through inlet port 14 for maintaining a substantially uniform flow through outlet port 16. Inlet pressure acting on the end of poppet C and on piston 44, 44a against the biasing force of spring 86 adjusts the relative open position of poppet C for maintaining a substantially uniform flow through outlet port 16.

The piston and diaphragm arrangement within pressure chamber 18 defines a pressure responsive means connected with poppet C and being responsive to a predetermined excessive pressure in the pressure chamber for overcoming the biasing force of spring 86 to adjust the poppet to a different open position.

It is obvious that many different arrangements are possible depending upon the size of the valve and the desired flow rate therethrough. In one arrangement, the spring rate of spring 86 and the taper on the frusto-conical end portion of poppet C are matched to produce a flow of approximately 0.43 gallons per minute over a wide range of inlet pressures. Outlet port 16 may then be sized to produce such a flow rate when pressure chamber 18 is at approximately 2.4 PSIG. Any deviation in the pressure within pressure chamber 18 is sensed by the pressure responsive means defined by the piston and diaphragm to further adjust the position of poppet C and maintain a regulated flow of water through outlet port 16.

Housing B and poppet C are preferably molded of a plastic material having sufficient compliance to provide a good seal between seat 28 and the frusto-conical surface on poppet C without requiring any rubber washers or the like. Many different types of plastics are suitable including, but not limited to, polyamides.

Although the invention has been shown and described with respect to certain preferred embodiments, it is obvious that equivalent alterations and modifications will occur to others skilled in the art upon the reading and understanding of this specification. The present invention includes all such equivalent alterations and modifications, and is limited only by the scope of the claims.

I claim:

1. A valve including a valve housing having inlet and outlet ports therein, said inlet port having an inlet pressure side and an opposite side, said inlet port being integral with said valve housing and having a seat adjacent said inlet pressure side, poppet means movable into and out of engagement with said seat for selectively closing and opening said inlet port, said poppet means and said seat being cooperative with one another for completely blocking flow through said inlet port when said poppet means is in engagement with said seat, said poppet means being positioned for movement toward said seat responsive to inlet pressure acting thereon, first yieldable biasing means for biasing said poppet means into engagement with said seat, manually operable means for releasing the biasing force of said first biasing means on said poppet means, second yieldable biasing means for biasing said poppet means off said seat responsive to release of the biasing force of said first biasing means, both of said first and second yieldable biasing means being located on said opposite side of said inlet port, a pressure chamber between said inlet and outlet ports, pressure responsive means connected with said poppet means and being responsive to the pressure in said pressure chamber for adjusting the position of said poppet means relative to said seat, the position of said poppet means responsive to pressure in said pressure chamber being completely independent of and being completely unaffected by said first yieldable biasing means when the biasing force of said first yieldable biasing means on said poppet means is released by operation of said manually operable means so that only said second yieldable biasing means applies force to said poppet means in said open position thereof, said pressure responsive means including a diaphragm and said valve including a guide sleeve on said opposite side of said inlet port, and said pressure responsive means having guide means thereon cooperating with said guide sleeve for guiding movement of said pressure responsive means and of said poppet means.

2. A valve including a valve housing having inlet and outlet ports therein, said inlet port being integral with said housing and having an inlet pressure side and an opposite side, a movable poppet for selectively opening and closing said inlet port, selectively releasable first yieldable biasing means for normally biasing said poppet to a closed position in which said inlet port is closed, said inlet port having a seat cooperating with said poppet in said closed position thereof for completely blocking flow through said inlet port, selectively operable second yieldable biasing means for yieldably biasing said poppet to an open position in which said inlet port is open, manually operable means for releasing said first yieldable biasing means and operating said second yieldable biasing means for moving said poppet from said closed position to said open position, and said poppet being positioned for movement from said open position toward said closed position against the biasing force of said second yieldable biasing means in response to inlet pressure acting thereon, the force of said releasable first yieldable biasing means being completely removed from said poppet while said manually operable means remains operated for maintaining said poppet in said open position so that only said second yieldable biasing means applies force to said poppet in said open position thereof, a pressure chamber between said inlet and outlet ports, a pressure responsive diaphragm connected with said poppet means and being responsive to the pressure in said pressure chamber for adjusting the position of said poppet means relative to said seat, the position of said poppet means responsive to pressure in said pressure chamber being completely independent of and being completely unaffected by said first yieldable biasing means when the biasing force of said first yieldable biasing means on said poppet means is released by operation of said manually operable means so that only said second yieldable biasing means applies force to said poppet means in said open position thereof, said valve including a guide sleeve on said opposite side of said inlet port, and said diaphragm having guide means thereon cooperating with said guide sleeve for guiding movement of said poppet means, whereby the balance between inlet pressure and the force of said second yieldable biasing means adjusts the open position of said poppet to regulate flow through said inlet port.

3. A valve including a valve housing having inlet and outlet ports, said inlet port being integral with said valve housing and having an inlet pressure side and an opposite side, said inlet port having a seat adjacent said inlet pressure side, a movable poppet extending through said inlet port and having an enlargement thereon on said inlet pressure side of said inlet port for cooperation with said seat to selectively close and open said inlet port, said poppet and said seat being cooperative with one another for completely blocking flow through said inlet port when said poppet is in engagement with said seat, manually operable means located on said opposite side of said inlet port and being movable in one direction generally toward said inlet port for opening same and being movable in an opposite direction generally away from said inlet port for closing same, said manually operable means being movable relative to said poppet in said one direction, said manually operable means during movement thereof in said opposite direction being cooperable with said poppet for moving said poppet in a direction for engaging said enlargement thereon with said seat, first yieldable biasing means acting between said housing and said manually operable means for moving said manually operable means in said opposite direction to engage said poppet enlargement with said seat and close said inlet port, second yieldable biasing means acting between said manually operable means and said poppet for moving said poppet in a direction for displacing said poppet enlargement from said seat to open said inlet port upon manual movement of said manually operable means in said one direction to overcome the biasing force of said first yieldable biasing means on said manually operable means and on said poppet so that only said second yieldable biasing means applies force to said poppet in said open position thereof, said poppet enlargement when displaced from said seat being responsive to inlet pressure acting thereon for movement thereof toward said seat against the biasing force of said second yieldable biasing means acting on said poppet, a pressure chamber between said inlet and outlet ports, a pressure responsive diaphragm connected with said poppet means and being responsive to the pressure in said pressure chamber for adjusting the position of said poppet means relative to said seat, the position of said poppet means responsive to pressure in said pressure chamber being completely independent of and being completely unaffected by said first yieldable biasing means when the biasing force of said first yieldable biasing means on said poppet means is released by operation of said manually operable means so that only said second yieldable biasing means applies force to said poppet means in said open position thereof, said valve including a guide sleeve on said opposite side of said inlet port, and said diaphragm having guide means thereon cooperating with said guide sleeve for guiding movement of said poppet means.

4. The valve of claim 3 including a guide sleeve on said opposite side of said inlet port, and guide means on said poppet closely slidably guided in said guide sleeve for guiding movement of said poppet.

5. The valve of claim 3 including a pressure chamber between said inlet and outlet ports, pressure responsive means connected with said poppet and being responsive to the pressure in said pressure chamber for moving said poppet to adjust the position of said enlargement relative to said seat, both of said first and second yieldable biasing means being located on the opposite side of said pressure responsive means from said inlet port.

6. A valve having inlet and outlet ports and a valve housing, said inlet port having an inlet pressure side and an opposite side, said inlet port having a seat adjacent said inlet pressure side, poppet means movable into and out of engagement with said seat for selectively closing and opening said inlet port, said poppet means being positioned for movement toward said seat responsive to inlet pressure acting thereon, first yieldable biasing means for biasing said poppet means into engagement with said seat, manually operable means for releasing the biasing force of said first biasing means on said poppet means, second yieldable biasing means for biasing said poppet means off said seat responsive to release of the biasing force of said first biasing means, both of said first and second yieldable biasing means being located on said opposite side of said inlet port, a pressure chamber between said inlet and outlet ports, a piston in said chamber connected with said poppet means and being movable responsive to pressure in said pressure chamber for positively imparting movement to said poppet means in either of opposite directions for adjusting the position of said poppet means relative to said seat, a flexible diaphragm connected between said piston and said valve housing, and said diaphragm having a thickened cup-like portion in which said piston is grippingly received.

7. The valve of claim 6 wherein said piston has a circumferential groove in its outer periphery, said diaphragm having a circumferential projection received in said groove.

* * * * *